Patented Oct. 21, 1947

2,429,459

UNITED STATES PATENT OFFICE 2,429,459

PRODUCTION OF VINYL CYANIDE

Charles R. Harris, Lockport, N. Y., assignor to E. I. du Pont de Nemours & Company, Wilmington, Del., a corporation of Delaware No Drawing. Application April 19, 1946,
Serial No. 663,604

4 Claims. (Cl. 260—464)

This invention relates to the production of vinyl cyanide and has as its object a novel method for producing this chemical.

In accordance with my invention, I subject succinonitrile vapor to pyrolysis at a temperature within the range of about 300–700° C., whereby I have discovered that vinyl cyanide is formed in good yield by the following reaction:

$$CNCH_2CH_2CN \rightarrow CH_2CHCN + HCN$$

The reaction is endothermic.

This application is a continuation-in-part of my copending application Serial No. 518,013, filed January 12, 1944.

In a preferred mode of practicing my invention, succinonitrile is heated to form vapor which is passed through a heated reactor or passed over any suitable heated surface in the presence solely of inert material. By "inert material" is, of course, meant material which is catalytically inactive and which is inert to reactants and reaction products. Such material includes, for example, glass, porcelain, stainless steel, and the like.

The process of the present invention may be carried out at a temperature within the range 300–700° C., with particularly high yields to be obtained at a temperature between 500° C. and 650° C. Some formation of vinyl cyanide will occur when the succinonitrile is pyrolyzed at a temperature as low as 300° C., but below this temperature the yield becomes too low to be of commercial importance. I prefer not to exceed a temperature of about 700° C. to avoid excessive, undesired decomposition reactions.

I prefer to carry out the reaction in the presence of an inert diluent gas such as hydrogen or nitrogen. Such gas may be mixed with succinonitrile vapors and the vapor-gas mixture subjected to the pyrolyzing temperature, or the gas may be separately introduced into the reaction space. The amount of diluent gas may be varied over a wide range, e. g., from 10% to 90% by volume of the vapor-gas mixture. Ordinarily, a mixture of about 50% diluent gas is preferred.

The following example further illustrates my invention:

Example

A vertical, stainless steel tube provided with an inlet at the top and an outlet at the bottom was arranged to be heated in an electric furnace. A layer of small porcelain Raschig rings was placed in the bottom of the tube upon which was placed a three-inch layer (75 cc.) of glass beads. The glass beads rested on the Raschig rings. A thermocouple was provided for measuring the temperature between the Raschig rings and the glass beads. When a dehydrocyanating catalyst is used, it is placed between the Raschig rings and glass beads. A catalyst was used for comparison of results as set forth below.

In operation, the tube was heated to an inside temperature of 300° C. to 700° C., and a slow stream of molten succinonitrile was introduced in the top of the tube onto the glass beads. The succinonitrile was rapidly vaporized on contact with the hot glass beads, and the vapors were immediately subjected to the pyrolyzing temperature. The succinonitrile vapors were diluted with hydrogen which was introduced in the top of the reaction tube, above the glass beads. This example shows comparative results with similar pyrolysis carried out in the presence of the following dehydrocyanating catalysts:

| Run | Catalyst |
|---|---|
| A | 300 cc. of alumina pellets. |
| B | 300 cc. of alumina pellets impregnated with 10% by weight of a 50-50 mixture of sodium and potassium cyanide. |
| C | 75 cc. of 4–8 mesh size wood charcoal impregnated with about 15% by weight of a 50-50 mixture of sodium and potassium cyanides. |
| D | 12.5 cc. of the catalyst of Run C. |
| E | 75 cc. of wood charcoal, 4–8 mesh size. |
| F | none. |
| G | none. |
| H | 150 cc. of the catalyst of Run C. |

The following results were obtained:

| Run | Succinonitrile Input | Hydrogen Input | Reaction Temperature | Succinonitrile Converted to Vinyl Cyanide |
|---|---|---|---|---|
| | | | | Per cent |
| A | 3.5 gms./min. | 1000 cc./min. | 530° C. | 52.2 |
| B | do | do | 525° C. | 73.8 |
| C | do | do | 525° C. | 90.9 |
| D | do | do | 620–658° C. | 88.5 |
| E | do | do | 525° C. | 71.8 |
| F | do | do | 640–650 °C. | 94.0 |
| G | do | 600 cc./min. | 602–650° C. | 89.2 |
| H | do | None | 550–590° C. | 72.9 |

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. A process for the production of vinyl cyanide which comprises subjecting succinonitrile vapor to pyrolysis at a temperature of 300° C. to 700° C. in the presence solely of inert material.

2. A process for the production of vinyl cyanide which comprises subjecting succinonitrile vapor to pyrolysis at a temperature of 500° C. to 650° C. in the presence solely of inert material.

3. A process for the production of vinyl cyanide which comprises subjecting succinonitrile vapor together with an inert gas to pyrolysis at a temperature of 500° C. to 650° C. in the presence solely of inert material.

4. A process for the production of vinyl cyanide which comprises subjecting succinonitrile vapor together with hydrogen to pyrolysis at a temperature of 500° C. to 650° C. in the presence solely of inert material.

CHARLES R. HARRIS.

REFERENCES CITED

The following references are of record in the file of this patent:

UNITED STATES PATENTS

| Number | Name | Date |
| --- | --- | --- |
| 2,407,848 | Ray | Sept. 17, 1946 |
| 2,205,239 | Carter et al. | June 18, 1940 |